United States Patent
Harris

(10) Patent No.: US 8,870,053 B2
(45) Date of Patent: Oct. 28, 2014

(54) METHOD FOR BRAZING METAL PARTS

(76) Inventor: Joseph W. Harris, Cincinnati, OH (US)

(*) Notice: Subject to any disclaimer, the term of this patent is extended or adjusted under 35 U.S.C. 154(b) by 0 days.

(21) Appl. No.: 13/553,229

(22) Filed: Jul. 19, 2012

(65) Prior Publication Data
US 2013/0020378 A1 Jan. 24, 2013

Related U.S. Application Data

(60) Provisional application No. 61/510,279, filed on Jul. 21, 2011.

(51) Int. Cl.
| | | |
|---|---|---|
| *B23K 1/19* | (2006.01) | |
| *B23K 20/16* | (2006.01) | |
| *B23K 20/22* | (2006.01) | |
| *B23K 35/24* | (2006.01) | |
| *B23K 31/02* | (2006.01) | |
| *C22C 9/00* | (2006.01) | |
| *B23K 1/00* | (2006.01) | |
| *B23K 35/30* | (2006.01) | |
| *C22C 5/08* | (2006.01) | |

(52) U.S. Cl.
CPC ............ *B23K 1/0008* (2013.01); *C22C 9/00* (2013.01); *B23K 35/3006* (2013.01); *B23K 1/19* (2013.01); *B23K 2201/06* (2013.01); *B23K 35/3013* (2013.01); *C22C 5/08* (2013.01); *B23K 2203/08* (2013.01); *B23K 2203/12* (2013.01); *B23K 35/302* (2013.01)
USPC .............. 228/262.1; 228/262.9; 228/262.6; 228/262.61; 228/258

(58) Field of Classification Search
USPC ........... 228/262.1, 262.9, 262.6, 262.61, 258, 228/256
See application file for complete search history.

(56) References Cited

FOREIGN PATENT DOCUMENTS

| | | | |
|---|---|---|---|
| DE | 202010011820 U1 | 11/2010 | |
| EP | 0465861 A1 | 1/1992 | |
| GB | 1082667 A | 9/1967 | |
| JP | 57195598 A | 12/1982 | |
| JP | 03099794 A | * | 4/1991 |
| JP | 10202391 A | 8/1998 | |
| JP | 11123593 A | 5/1999 | |
| JP | 2005066694 A | 3/2005 | |
| JP | 2006051514 A | 2/2006 | |

OTHER PUBLICATIONS

JP 03099794 A written translation.*

(Continued)

*Primary Examiner* — Erin Saad
(74) *Attorney, Agent, or Firm* — Wood, Herron & Evans, LLP

(57) ABSTRACT

A method of forming a brazed joint is provided in which a surface portion of a first metal part is placed in contact with a surface portion of a second metal part to form a contact area therebetween, and the first and second metal parts include copper, silver and/or gold as the primary base metal(s) and at least the surface portion of the first metal part is a modified alloy of the primary base metal(s) having 0.5-12 wt. % phosphorus as a modifier. The surface portion of the first metal part is heated to a temperature sufficient to cause the phosphorus to wet the surface portion of the second metal part and to flow a low melting portion of the first metal part into the contact area by capillary attraction to form the brazed joint between the first and second metal parts.

10 Claims, 3 Drawing Sheets

(56) References Cited

OTHER PUBLICATIONS

European Patent Office, International Search Report and Written Opinion issued in corresponding International Application No. PCT/US2012/047572 dated Nov. 16, 2012, 10 pp.

Machine English translation of JP2006051514, 9 pp.
Machine English translation of JP11123593, 7 pp.
Machine English translation of DE202010011820, 6 pp.
Machine English translation of JP2005066694, 6 pp.
Machine English translation of EP0465861, 3 pp.
Machine English translation of JP10202391, 9 pp.

* cited by examiner

METHOD FOR BRAZING METAL PARTS

CROSS REFERENCE TO RELATED APPLICATION

Pursuant to 37 C.F.R. §1.78(a)(4), this application claims the benefit of and priority to prior filed Provisional Application Ser. No. 61/510,279 filed Jul. 21, 2011, entitled METHOD FOR BRAZING METAL PARTS, which is expressly incorporated herein by reference.

BACKGROUND OF THE INVENTION

By definition, brazing is a process for joining similar or dissimilar metals, i.e., at least two base metals, using a filler metal that typically includes a base of copper combined with silver, nickel, zinc or phosphorus. More specifically, the assembly is heated to flow and distribute the filler metal between two or more close-fitting parts by capillary action. To achieve this, the filler metal is brought slightly above its melting (liquidus) temperature while protected by a suitable atmosphere, usually a flux. The melted brazing alloy in contact with the base metals then flows over the base metals (known as wetting) and into the joint by capillary attraction, and is then cooled to join the base metals together. Brazing is distinguished from soldering by the temperature used to melt the filler metal, which is above 450° C. (842° F.). Brazing differs from welding in that brazing does not appreciably melt the base metals, therefore brazing temperatures are lower than the melting points of the base metals. For the same reason, brazing is a superior choice in joining dissimilar metals. Brazed joints are strong, e.g., a properly-made joint (like a welded joint) will in many cases be as strong as, or stronger than, the joined base metals.

Brazing of copper and copper alloys is most often performed using phosphorus-copper brazing alloys as the filler metal, also known as phos-copper alloys, classified as BCuP 1-7 by the American Welding Society (AWS). Silver may also be added to the copper and phosphorus to accomplish special features for a wide variety of applications, and these alloys are generally known as silver-phos-copper alloys. The phos-copper and silver-phos-copper alloys are generally used for brazing together base metals of copper and the copper alloy group of metals, namely, alloys of copper with zinc, gold, tin, silver and/or antimony. Although silver and gold metals are readily brazed with AWS brazing alloys BCuP 1-7, these brazing alloys are seldom used because they are a poor color match for silver and gold.

The brazing alloy is used in the form of wire, rod, strip, powder, paste, and preform shapes, which are placed between or adjacent to the surfaces of the two parts to be joined. Depending on the application, the filler material can be pre-placed at the desired location or applied during the heating cycle. For manual or torch brazing, wire and rod forms are generally used as they are the easiest to apply while heating. High skill is often required for this labor intensive process. In the case of furnace brazing, the brazing alloy is typically placed beforehand since the process is usually highly automated.

To obtain high-quality brazed joints, parts must be closely fitted, and the base metals should be clean and free of oxides. A flux may be required to prevent oxides from forming while the metal is heated. The flux also serves the purpose of cleaning any contamination left on the brazing surfaces. Flux can be applied in any number of forms including flux paste, liquid, powder or pre-made brazing pastes that combine flux with filler metal powder. Flux can also be applied using brazing rods with a coating of flux, or a flux core. In either case, the flux first flows into the joint when applied to the heated joint and is subsequently displaced by the molten filler metal entering the joint. Phos-copper and silver-phos-copper brazing alloys can be self-fluxing when joining copper to copper, and more specifically, the phosphorus addition in the brazing alloy acts as a flux for joining copper base metals. Phosphorus lowers the brazing temperature in addition to acting as the flux and wetting and removing oxides from the surfaces being joined.

The smaller the parts to be joined, the more difficult it is for a precise joint to be formed. The brazing alloy must be completely or nearly completely molten to flow under capillary attraction, and when completely molten, the brazing alloy may flow like a thin liquid and may run onto surfaces outside the joint where the brazing alloy is not needed or wanted. Great skill and effort can be required when brazing with BCuP 1-7 alloys. The parts to be joined must be arranged carefully, and brazing alloy preforms must be made to an exacting size and required volume of metal. Brazing of small, delicate pieces of jewelry, for example, require high precision that is difficult with a brazing operation. Additionally, adding brazing flux to an assembly takes care, and the brazing process must be carefully monitored for parts that may move due to melting of the brazing flux. If a part moves during brazing, the process must be stopped to make corrections to the position. In industrial uses where joints are being formed in place, the location of the parts to be brazed may present difficulty in accurately placing the filler metal while applying the torch heat.

There is thus a need for a way to form joints that requires less skill and precision by the operator and that can be used with small parts and with base metals of copper, gold and/or silver.

SUMMARY OF THE INVENTION

According to one embodiment, in a method of forming a brazed joint, a surface portion of a first metal part is placed in contact with a surface portion of a second metal part to form a contact area therebetween, wherein the first and second metal parts comprise copper, silver and/or gold as the primary base metal(s) and at least the surface portion of the first metal part is a modified alloy of the primary base metal(s) having 0.5-12 wt. % phosphorus as a modifier. The surface portion of the first metal part is heated to a temperature sufficient to cause the phosphorus to wet the surface portion of the second metal part and to flow a low melting portion of the first metal part into the contact area by capillary attraction to form the brazed joint between the first and second metal parts.

According to another embodiment, in a method of forming a brazed joint, a first metal part is provided comprising a modified alloy of copper, silver and/or gold as the primary base metal(s) and 0.5-12 wt. % phosphorus as a modifier, the modified alloy having a solidus temperature above 450° C., a low melting portion, and a high melting portion. A second metal part comprising copper, silver and/or gold as the primary base metal(s) is placed in contact with a surface portion of the first metal part to form a contact area therebetween. The first metal part is heated at a brazing temperature above the solidus temperature sufficient to cause the phosphorus therein to wet a surface of the second metal part and to sufficiently melt the low melting portion of the first metal part to enable flow while maintaining the high melting portion as a solid, and the brazing temperature is maintained for a time sufficient to allow a quantity of the low melting portion to flow from the surface portion into the contact area by capillary attraction to form the brazed joint between the first and second metal parts.

According to yet another embodiment, in a method of forming a brazed joint, a surface portion of a first metal part is placed in contact with a surface portion of a second metal part to form a contact area therebetween, wherein the first metal part is an alloy comprising copper, silver and/or gold as the primary base metal(s) and 0.5 12 wt. % phosphorus, and the second metal part comprises copper, silver and/or gold as the primary base metal(s). The surface portion of the first metal part is heated to a temperature sufficient to cause the phosphorus to wet the surface portion of the second metal part and to flow a low melting portion of the first metal part into the contact area by capillary attraction to form the brazed joint between the first and second metal parts, while maintaining a high melting portion of the first metal part as a solid, and while maintaining the second metal part as a solid, wherein the brazed joint is formed from the low melting portion of the first metal part without the supply of an additional filler metal.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
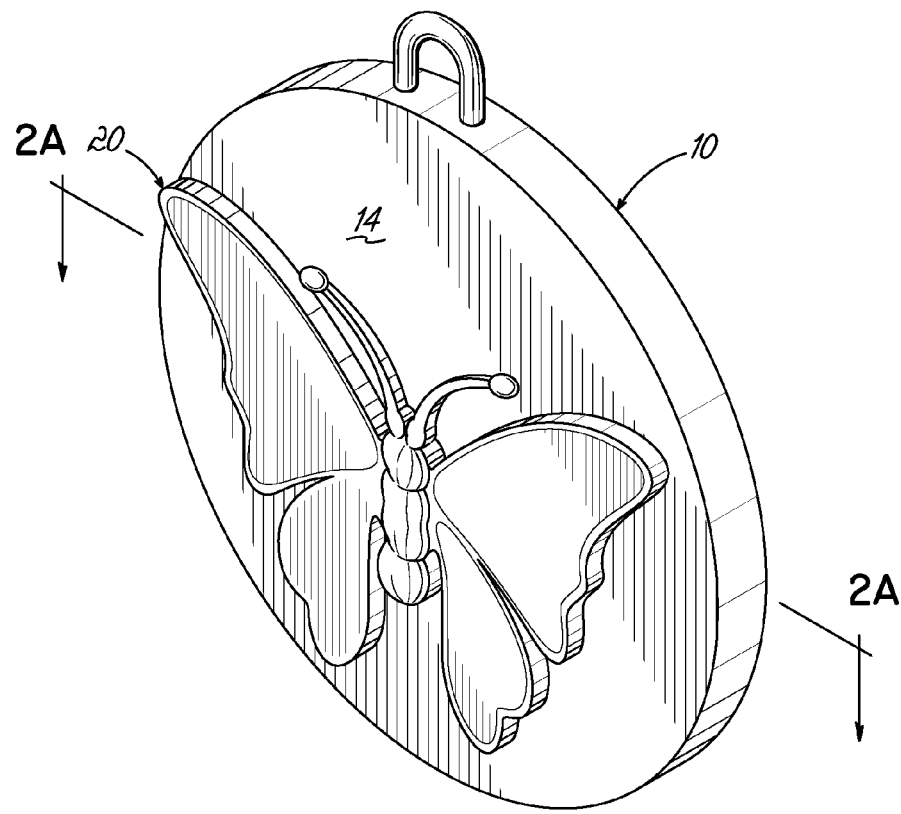
FIG. 1 is a perspective view of a first metal part, in the form of a necklace pendent, and a second metal part, in the form of a butterfly to be brazed onto the pendent (drawings are not to scale).

The present invention provides a base metal that is itself a brazing alloy. By recognizing the value of phosphorus in the phos-copper brazing alloys as the element that prepares copper, silver, gold and their alloys for brazing, it has been discovered that adding phosphorus to a base metal of copper, silver and/or gold actually changes the base metal itself to a brazing alloy with unique properties. This modified base metal of the invention will be referred to as a P-Base Metal. When at least one of the two parts to be joined includes a P-Base Metal surface, and where a capillary area is available, brazing is accomplished without the need for a separate filler metal.

The invention will now be explained with reference to FIGS. 1, 2 and 2A and in the context of joining a first part 10 to a second part 20, where the first part includes a P-Base Metal surface 12 and is thus referred to as the first P-Base Metal part 10. The first P-Base Metal part 10 and the second part 20 are placed in contact such that there is an intersecting contact area 30 where the joint 40 is to be formed, and surfaces 14, 24 on one or both of the first and second parts 10, 20 that are adjacent the intersecting contact area 30 but not in contact. Intersecting contact area 30 is such that it constitutes a capillary area.

The P-Base Metal is an alloy and does not melt at a single temperature, but rather, melts within a temperature range. The alloy contains various "portions" or components that melt at different temperatures between the solidus temperature and liquidus temperature of the alloy. Thus, as heat is applied, the low melting portions will become molten first, and the high melting portions will turn molten last, until the entire alloy reaches its liquidus temperature. If insufficient heat is applied to the alloy to reach its liquidus temperature, then high melting portions may remain solid while low melting portions are sufficiently molten to be able to flow to an available capillary area. Capillary attraction occurs when the force of attraction of the liquid molecules to an adjacent and contacting solid is greater than the force of cohesion of the liquid molecules to each other. In the intersecting contact area 30, the capillary attraction pulls the liquid of the low melting portion toward the surface of the second part 20 to form a joint 40 therebetween. At surfaces where there is no capillary or contact area 30 on the first P-Base Metal part 10, the cohesive force is much greater and maintains the liquid of the low melting portion within the first P-Base Metal part 10. Thus, no alloy flows outside the joint 40.

By way of further explanation, heat, for example from a torch or a furnace, is applied to the first P-Base Metal part 10 at least in the intersecting contact area 30. As the brazing temperature becomes sufficiently hot (above the solidus temperature but below the liquidus temperature), the lower melting portions at the surface 12 of the first P-Base Metal part 10 soften and melt first, while the higher melting portions remain solid. Phosphorus is a lower melting portion and is evidenced at the temperature where the first P-Base Metal part 10 first softens. More specifically, the surface 12 of the first P-Base Metal part 10 experiences very small miniature explosions or eruptions by virtue of the phosphorus content. The disturbances cause several holes of about 0.001 inch (0.0254 mm) in diameter to open on the face of the first P-Base Metal part 10, and then close. At about this time, the surface 12 of the first P-Base Metal part 10 takes on a "shine" in areas 14 adjacent to the intersecting contact area 30, similar in appearance to a black roadway that looks to be wet in places, although it is dry. When the "shine" takes place, phosphorus contained in the P-Base Metal is moving and wetting the surface 22 (the underside) of the second part 20. Simultaneously, with wetting of the surface 22 of the second part 20 in the intersecting contact area 30, and while maintaining the temperature, the lower melting portions of the first P-Base Metal part 10 are subject to the attractive force caused by the presence of a capillary area and thus move to the intersecting contact area 30 to complete the braze. Brazing continues at this temperature until a sufficient portion of the braze alloy has flowed from the surface 12 of the first P-Base Metal part 10 to the joint 40 with the second part 20. Except for the actual braze area, the balance of the P-Base Metal part 10 does not change its shape, due to the cohesive forces. The braze of the invention takes advantage of the low melting portions of the alloy and an available capillary area to allow the low melting portions to move under the force of capillary attraction. No metal is added to surfaces 14, 24 on the first and second parts 10, 20 that are adjacent the intersecting contact area 30 but not in contact, i.e., the flow of metal is only into the joint 40 and not outside the joint to surfaces where a braze is not desired.

In this way, the P-Base Metal flows into the joint 40 by capillary attraction, which is the characteristic mechanism of brazing, but the addition of a separate filler metal is eliminated since the brazing alloy comes from the surface of one of the parts to be joined. Welding, on the other hand, melts the base metals of both parts, where the metals must be similar, and the boundary between the two parts essentially disappears. No capillary flow occurs in welding processes. In the modified brazing method of the invention, a joint is formed where the filler metal flows from one of the two parts to be joined into the joint area, and is neither strictly a welding process nor a brazing process, as those methods are conventionally known, but rather, a modified brazing process where the filler metal is essentially incorporated into and forms the base metal of one of the parts to be joined.

In the description below, all percents are weight percent unless otherwise noted. Copper, silver and/or gold may be used as the primary base metal(s), with 0.5-12% phosphorus, and various amounts of other elements as desired, and as further described below. In one embodiment, the P-Base Metal is a copper, silver or copper-silver alloy that may comprise or consist of 0.5-92.5% silver, 1-12% phosphorus, and the balance copper. For example, the P-Base Metal may be sterling silver modified by the addition of phosphorus. Sterling silver used in jewelry typically has a composition of 92.5% silver and 7.5% copper. This alloy can be modified for use in the present invention, for example, by adding 5 parts phosphorus to 95 parts sterling silver. For use with other silver items, such as flatware or silver service sets, the amount of silver can vary, for example from 80% to 95%. Copper is added to reduce melting temperature, and for toughness and strength, i.e., to reduce scratching and damage, and to reduce cost. Gold, of course, is used extensively in fine jewelry. Copper is used extensively for piping in industrial uses, such as water and refrigerant lines. Any of these metals may be used in creating metal artwork. Other elements, such as nickel, zinc, cadmium, tin, antimony, indium, selenium, etc., may be added to the P-Base metal as minor additions to add strength, color, ductility, decoration, tarnish-resistance, and other properties depending on the base metal and application.

Figure 2:
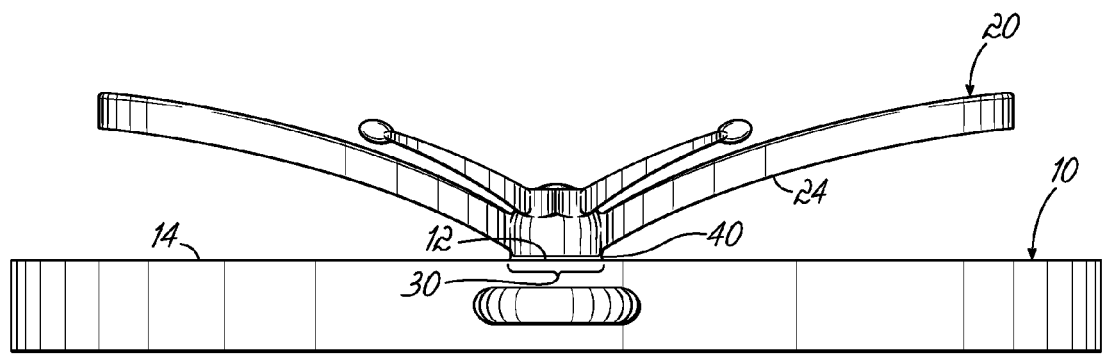
FIG. 2 is an end view of the parts of FIG. 1 depicting a contact area between the first and second parts.
Figure 2A:
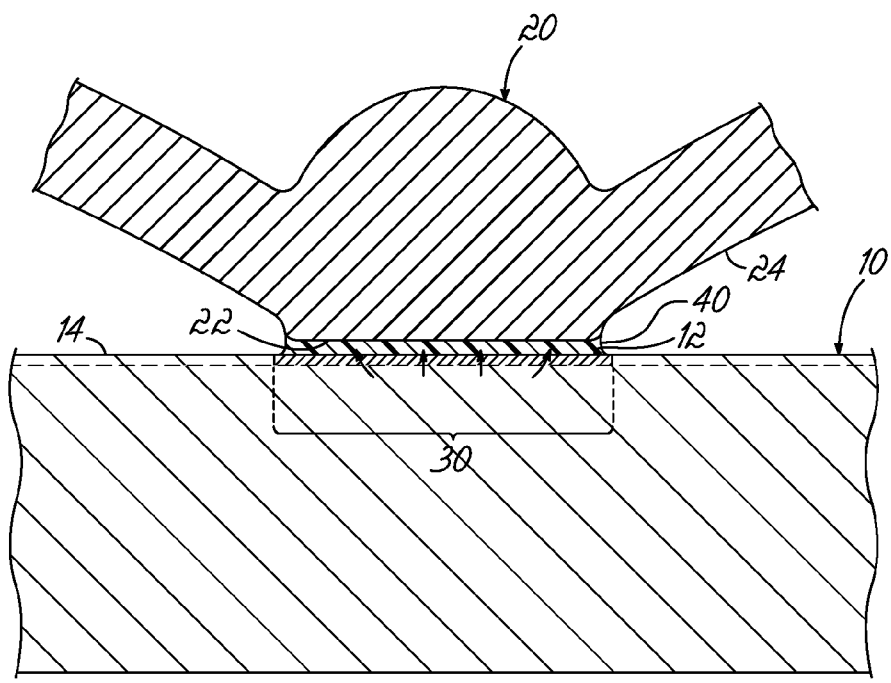
Figure 3:
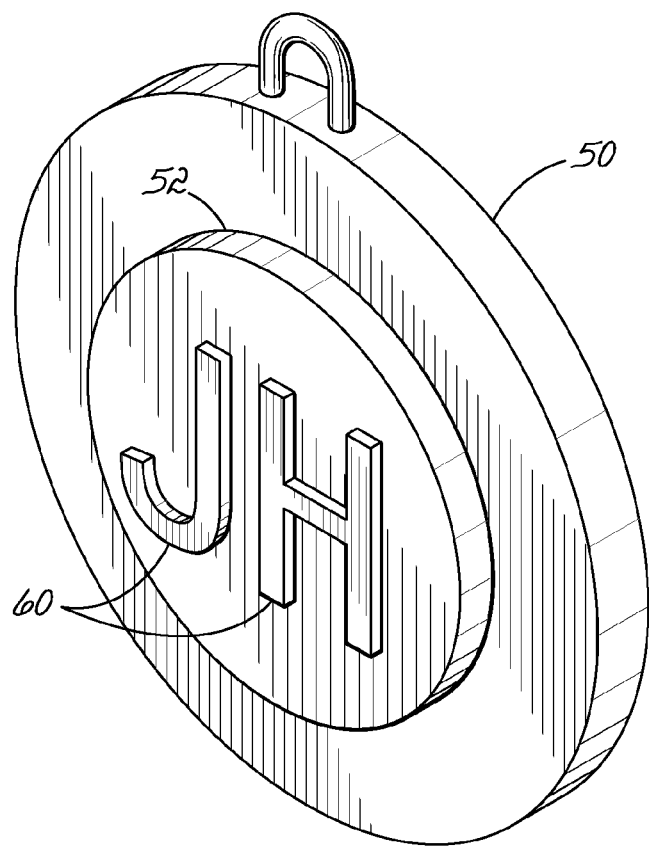
FIG. 3 is an enlarged cross-sectional view of a portion of FIG. 1 taken along line 2A-2A of FIG. 1.

FIGS. 1-2A illustrate one part being made entirely of the P-Base Metal, however, the invention is not so limited. For example, as illustrated in FIG. 3, the first part could include a metal or metal alloy substrate 50, such as a gold pendant, having a P-Base Metal coating or part 52 on all or a portion thereof. The P-Base Metal coating or part 52 could be, for example, a phosphorus-modified sterling silver disk that is itself brazed onto the substrate 50 by the method of the invention, or a coating deposited onto the substrate 50 by any known suitable method. The second parts 60, such as gold letters, can then be brazed onto the surface portion of the first part that is the P-Base Metal coating or part 52 by the method of the invention. Where P-Base Metal coating or part 52 is brazed to both the substrate 50 and the second parts 60, it then constitutes a single part that is effective for joining multiple parts together.

Figure 4:
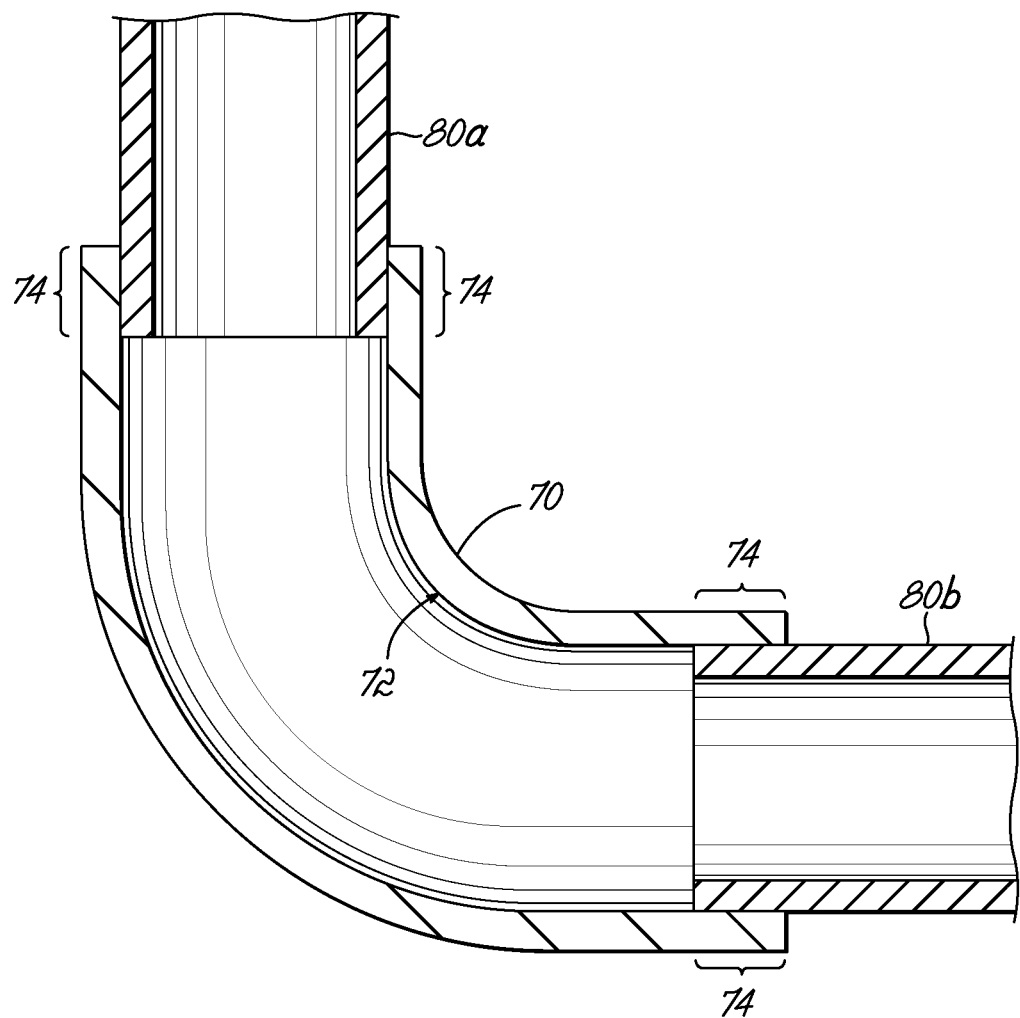
FIG. 4 is a cut-away view of a coupling of the invention for joining two copper pipes.

Another example of a single P-Base Metal part effective for joining together multiple parts is depicted in FIG. 4. A P-Base Metal coupling 70 is used to join together a pair of copper pipes 80a, 80b. Heat is applied to the coupling 70 at the contact areas 74 in which the copper pipes 80a, 80b are inserted, and the inside surface portion 72 of the coupling 70 supplies the phosphorus for wetting the outer ends of the copper pipes 80a, 80b and the semi-molten metal for forming the brazed joints. In this embodiment, the entire coupling 70 may be made of the P-Base Metal or the inside surface portion 72 of a copper coupling 70 can be modified by adding a coating of the P-Base Metal. Such a coating is distinguished from simply applying a brazing paste, in that the coating is room temperature solid and permanently joined with the underlying part, such as by vapor deposition thereon or brazing thereto and subsequent cooling to form the permanently adhered coating.

The invention will now be further described in reference to an example for fine pieces of jewelry, which is a field that may particularly benefit from the invention. In one example, a P-Base Metal of 6% phosphorus, 70% silver, 24% copper is made into the shape of a necklace pendant. A dozen karat gold wires of 0.020 inch (0.508 mm) diameter are placed on the surface of the P-Base Metal pendent in close proximity to each other, with some touching in places and others separated by small margins. Other small parts of gold, silver or copper and their alloys may also be added onto the surface of the pendant. Applying sufficient heat by means of a torch or oven will cause brazing at the intersections of the P-Base Metal surface and the gold wires and any other gold, silver or copper parts. Where a part is overlapping another part, brazing will not take place in the area where the overlapping parts are not in contact with the P-Base Metal, but brazing does take place where extensions of the overlapping part meet the P-Base Metal. In other words, brazing takes place where a capillary area is present.

As the brazing temperature becomes sufficiently hot, the lower melting portions of the P-Base Metal soften and become fluid first. The surface of the pendant experiences very small miniature explosions or eruptions, causing the holes to open on the face of the pendant, and then close. The surface of the pendant takes on a "shine" in places adjacent to the braze area and phosphorus contained in the P-Base Metal is wetting the surface (the underside) of the gold wires and other parts that are to be joined. Simultaneously, with wetting of the surface of the parts, the P-Base Metal becomes sufficiently molten to a greater extent, and the low melting portions of the brazing alloy begin moving to the wires and other parts that are on the surface of the pendant and fill the capillary areas therewith. Brazing continues at this temperature until sufficient braze alloy has flowed from the pendant to the wires and parts being brazed. P-Base Metal parts to be brazed that contain zinc may require the use of a brazing flux to remove zinc oxides.

Brazing with P-Base Metal for one of the parts to be joined greatly simplifies the procedure to braze the parts to the pendant. After the parts are arranged on the pendant, brazing can proceed without fear of the parts being brazed to adjacent parts. Brazes made by using P-Base Metal do not show any excess brazing alloy on the surface of the pendant, as the cohesive forces prevent the alloy from flowing to any other area that is not a capillary area. The braze area formed by this process to join a round 0.020 inch (0.508 mm) gold Karat wire would be impossible to view on a part of jewelry. The curve of the wire shields the braze area from view.

Conventional brazing for gold jewelry would require difficult precise work of placing narrow strips or pieces of AWS BAu 1-6 gold brazing alloys between the gold parts and the pendant to be brazed. Brazing flux is also required along with the brazing alloy. The parts to be brazed and the pre-placed brazing alloy are likely to move, or float, as the brazing flux becomes fluid when molten just prior to brazing. Unwanted brazing can cause rejection of the part or need for extensive cleaning.

Conventional brazing with AWS BCuP 1-7 alloys occurs after the brazing alloy becomes molten, allowing the brazing alloy to flow between the parts and the pendant. At a minimum, the brazing alloy is visible where it encircles the parts. Where the parts are close together, adjacent parts may be joined together by the brazing alloy flowing onto the surface of the pendant. Unless the gold wires are independently spaced from each other, they could be accidentally joined into one unit.

By contrast, the P-Base Metal takes advantage of the alloy's natural process to melt sequentially, allowing the braze to increase in size as the temperature of the assembly and time of brazing increases. As the P-Base Metal first begins to melt, phosphorus wets the parts to be joined, allowing the brazing alloy to then move and join the parts together. The part being brazed is lying precisely on the top of the brazing alloy, i.e., on the P-Base Metal pendant, brazing the part by moving a very tiny distance, less than 0.001 inch (0.0254 mm). The braze can be increased in size and strength by prolonging the process. The operator can determine how much of a braze is required, using a lesser amount for jewelry work, and a greater quantity for certain industrial applications.

A major difference of the invention versus conventional brazing alloys used as filler metals is that the conventional BCuP 1-7 brazing alloys have to be completely or near molten, in order to flow between the parts and the pendant. When completely molten, the brazing alloys flow more like a thin liquid and may run onto the surface of the pendant where not wanted, or flow to adjacent parts where not intended.

A one square inch plate (25.4 mm×25.4 mm) of P-Base Metal composed of 93% silver and 7% phosphorus with a 0.150 inch (3.81 mm) thickness with 100 gold balls of 0.050 inch (1.27 mm) diameter, flattened on the bottom and brazed by the method of the invention would be void of the appearance of any brazing alloy on the surface of the plate or between the gold balls.

Greater skill and effort is required when brazing with conventional BCuP 1-7 alloys than with P-Base Metals. In the prior method, the parts to be brazed must be arranged carefully, with brazing alloy preforms made to an exacting size and required volume of metal. Adding brazing flux to the assembly takes care and the brazing process must be carefully monitored for the parts that may move due to melting brazing flux. Moving parts during brazing may require stopping the procedure and making corrections.

In the present invention, other than the normal detail of using clean parts that make very good contact with the P-Base Metal, the brazing operator need only watch the process closely to determine when the braze is complete and then stop the application of heat. This reduced skill allows for a novice to do satisfactory work.

P-Base Metals may be used as jewelry and as parts of jewelry. For example, sterling silver made of 92.5% silver, 6.5% phosphorus, balance copper can be made into the shapes of starfish, stars, insects, numerals, letters, arrows, people, dots, dashes, animals, bezels, stone and diamond holders, and numerous other objects. P-Base Metal parts may be placed upon existing or new jewelry made of silver, gold or copper or their alloys and brazed into place.

P-Base Metals can be used in many applications. Silver, copper and gold parts and their alloys can be brazed to distinct advantages over use of the AWS BCuP 1-7 brazing alloys. Copper pipe used to conduct water, refrigerant gases, food products and other materials can be more efficiently connected together by constructing the copper connecting couplings out of copper alloyed with 0.5-12% phosphorus, for example at least 1% phosphorus, and advantageously at least 3% phosphorus. In one example, the copper alloy contains 3-8% phosphorus, and in another example, 4-7% phosphorus. These couplings of copper alloys containing phosphorus are then the P-Base Metal as described above and can be brazed to the adjacent copper pipes without addition of a separate filler metal, as described with reference to FIG. 4. After the copper pipe and P-Base Metal couplings are assembled, the assembly is heated by torch or electric resistance.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope of the general inventive concept.

What is claimed is:

1. A method of forming a brazed joint, comprising:
providing a first metal part consisting of a modified alloy of copper, silver or gold, or any combination thereof, as the primary base metal(s), 0.5-12 wt. % phosphorus as a modifier, and optionally one or more of nickel, zinc, cadmium, tin, antimony, indium, or selenium as minor additions, the modified alloy having a solidus temperature above 450° C., a low melting portion, and a high melting portion;
placing a second metal part comprising copper, silver or gold, or any combination thereof, as the primary base metal(s) in direct contact with a surface portion of the first metal part to form a contact area therebetween;
heating the first metal part at a brazing temperature above the solidus temperature sufficient to cause the phosphorus therein to wet a surface of the second metal part and to sufficiently melt the low melting portion in the surface portion of the first metal part to enable flow while maintaining the high melting portion as a solid; and
maintaining the brazing temperature for a time sufficient to allow a quantity of the low melting portion to flow from the surface portion into the contact area by capillary attraction to form the brazed joint between the first and second metal parts.

2. The method of claim 1, wherein the second metal part is gold jewelry, and wherein the brazed joint is essentially invisible to the naked eye.

3. The method of claim 1, wherein the first metal part is a coupling consisting of the modified alloy, and the second metal part is a pair of copper pipes, each having the respective surface portion in contact with the surface portion of the coupling at opposing ends thereof, whereby the heating forms a pair of the brazed joints between the coupling and the pair of copper pipes.

4. The method of claim 1, wherein the modified alloy consists of sterling silver as the primary base metal(s) and 1-12 wt. % phosphorus.

5. A method of forming a brazed joint, comprising:
placing a surface portion of a first metal part in direct contact with a surface portion of a second metal part to form a contact area therebetween, wherein the first metal part consists of an alloy of copper, silver or gold, or any combination thereof, as the primary base metal(s), 0.5-12 wt. % phosphorus, and optionally one or more of nickel, zinc, cadmium, tin, antimony, indium, or selenium as minor additions, and the second metal part comprises copper, silver or gold, or any combination thereof, as the primary base metal(s); and
heating the surface portion of the first metal part to a temperature sufficient to cause the phosphorus to wet the surface portion of the second metal part and to flow a low melting portion in the surface portion of the first metal part into the contact area by capillary attraction to form the brazed joint between the first and second metal parts, while maintaining a high melting portion of the first metal part as a solid, and while maintaining the second metal part as a solid,
wherein the brazed joint is formed from the low melting portion of the first metal part without the supply of a filler metal.

6. The method of claim 5, wherein the second metal part is gold jewelry, and wherein the brazed joint is essentially invisible to the naked eye.

7. The method of claim 5, wherein the first metal part is a coupling consisting of the alloy, and the second metal part is a pair of copper pipes, each having the respective surface portion in contact with the surface portion of the coupling at opposing ends thereof, whereby the heating forms a pair of the brazed joints between the coupling and the pair of copper pipes.

8. The method of claim 5, wherein the alloy consists of sterling silver as the primary base metal(s) and 1-12 wt. % phosphorus.

9. The method of claim 5, wherein the alloy consists of 0.5-92.5% silver, 1-12% phosphorus, and the balance copper.

10. The method of claim 5, wherein the silver is present in an amount of 80% to 95%.

* * * * *